(12) United States Patent
Aljarallah et al.

(10) Patent No.: US 12,465,544 B1
(45) Date of Patent: Nov. 11, 2025

(54) WEARABLE ERGONOMIC PASSIVE ASSISTIVE DEVICE

(71) Applicant: KING SAUD UNIVERSITY, Riyadh (SA)

(72) Inventors: Meshary Ahmed Aljarallah, Riyadh (SA); Abdulmajeed Mohammed Bin Suwaid, Riyadh (SA); Muhammad Farzik Ijaz, Riyadh (SA); Khalid Fouad Alqosaibi, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 19/085,368

(22) Filed: Mar. 20, 2025

(51) Int. Cl.
*B25J 9/00* (2006.01)
*A61H 1/02* (2006.01)

(52) U.S. Cl.
CPC .......... *A61H 1/0281* (2013.01); *B25J 9/0006* (2013.01); *A61H 2201/0192* (2013.01); *A61H 2201/14* (2013.01); *A61H 2201/1635* (2013.01); *A61H 2201/165* (2013.01)

(58) Field of Classification Search
CPC .......... A61H 1/0281; A61H 2201/0192; A61H 2201/14; A61H 2201/1635; A61H 2201/165; A61H 2201/062; A61H 2205/06; B25J 9/0006; B25J 9/00
See application file for complete search history.

(56) References Cited

U.S. PATENT DOCUMENTS

| 11,026,859 | B1 * | 6/2021 | Rovekamp | A61H 1/0281 |
| 11,622,877 | B2 * | 4/2023 | Davies-Sekle | A61H 1/0277 |
| | | | | 602/20 |
| 12,011,405 | B1 * | 6/2024 | Rovekamp | A41D 1/002 |
| 2004/0073143 | A1 * | 4/2004 | Bonutti | A61F 5/013 |
| | | | | 601/5 |
| 2017/0173783 | A1 * | 6/2017 | Angold | B25J 9/0006 |
| 2017/0281387 | A1 * | 10/2017 | Mathie | A61F 5/0102 |
| 2019/0358808 | A1 * | 11/2019 | Yoshimi | B25J 9/0006 |
| 2020/0253770 | A1 * | 8/2020 | Doyle | B25J 9/0006 |
| 2020/0261298 | A1 * | 8/2020 | Kim | B25J 9/0006 |
| 2023/0373079 | A1 * | 11/2023 | Kim | B25J 9/109 |

(Continued)

FOREIGN PATENT DOCUMENTS

| CN | 111546316 A | | 8/2020 |
| CN | 114851164 A | * | 8/2022 |

(Continued)

OTHER PUBLICATIONS

Machine translation of written description and claims CN114851164A (Year: 2022).*

(Continued)

*Primary Examiner* — Timothy A Stanis
*Assistant Examiner* — Tyler A Raubenstraw
(74) *Attorney, Agent, or Firm* — Nath, Goldberg & Meyer; Joshua B. Goldberg

(57) ABSTRACT

A wearable ergonomic passive assistive device operates using a combination of springs and counterweights, which work in tandem to alleviate the pressure on the worker's muscles and joints. The wearable ergonomic passive assistive device also includes the incorporation of an adjustable lock mechanism that allows users to customize the level of resistance of the springs based on the weight of the object they are handling.

11 Claims, 6 Drawing Sheets

(56) References Cited

U.S. PATENT DOCUMENTS

| | | | |
|---|---|---|---|
| 2024/0075638 A1* | 3/2024 | Pinnock | A63B 21/4025 |
| 2024/0335938 A1* | 10/2024 | Bujold | B25J 9/1045 |
| 2025/0026002 A1* | 1/2025 | Kim | B25J 9/0006 |

FOREIGN PATENT DOCUMENTS

| | | | | |
|---|---|---|---|---|
| CN | 114800449 A | 7/2023 | | |
| CN | 116690543 A | 9/2023 | | |
| JP | 7305037 B2 | 7/2023 | | |
| WO | WO-2020204009 A1 * | 10/2020 | | B25J 9/0006 |
| WO | 2023038550 A1 | 3/2023 | | |

OTHER PUBLICATIONS

Machine translation of written description and claims WO2020204009A1 (Year: 2020).*

* cited by examiner

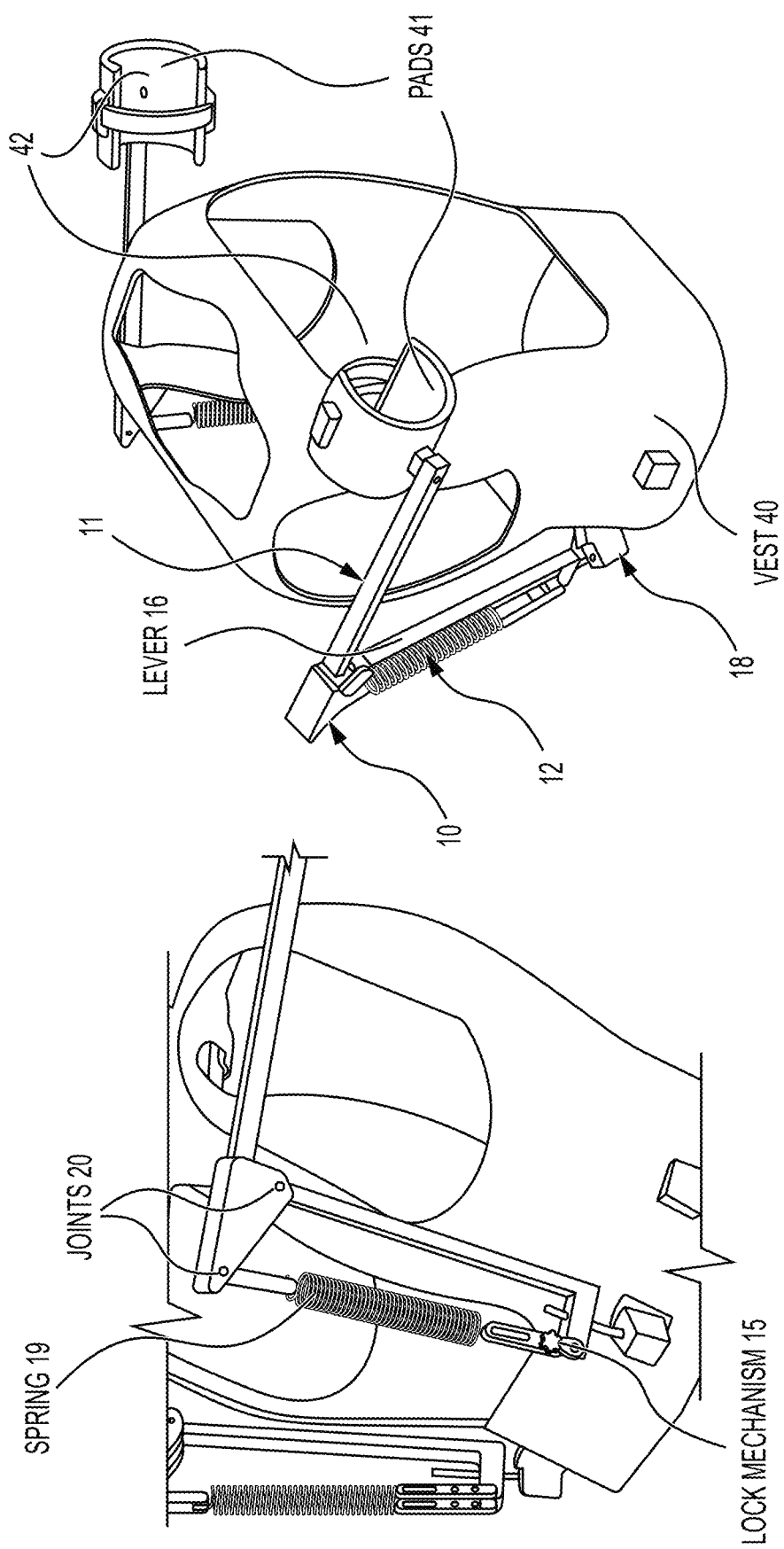

WEARABLE ERGONOMIC PASSIVE ASSISTIVE DEVICE

BACKGROUND

Field

The disclosure of the present patent application relates to a device, system, method, and apparatus used for injury prevention in a workplace environment, and particularly to a wearable ergonomic passive assistive device which when worn in the workplace environment substantially reduces the occurrence of injuries in the workplace environment.

Description of Related Art

Some workers, particularly those engaged in various types of physical labor, can face various challenges that put them at risk of serious injuries while on the job. Certain non-limiting factors that may contribute to these risks include:
1). Repetitive work responsibilities: Doing the same tasks over and over again can strain muscles and joints, leading to conditions like repetitive strain injuries (RSIs) or musculoskeletal disorders (MSDs);
2). Loss of balance due to carrying objects: Carrying heavy or awkward objects can throw off a worker's balance, increasing the likelihood of slips, trips, and falls, which can result in severe injuries such as fractures and/or head trauma; and
3). Lack of force distribution: Improper distribution of force when handling objects can put excessive strain on certain body parts, increasing the risk of strains, sprains, or even more serious injuries like hernias or ligament tears.

Addressing these factors through proper training, ergonomic interventions, and workplace safety protocols can help mitigate the risk of injuries and ensure a safer working environment for all employees. Such measures, however, are imperfect at best and leave a lot of room for improvement.

Workplace safety has increased in many developed nations, but work-related injuries (WRIs) are on the rise. Globally, approximately 2.9 million fatal work-related injuries and diseases occurred in 2021, up from 1.1 million in 1999. Focusing on one specific country, in comparison with non-Saudi workers, the Saudi workers' shares of injuries rose from 5.3% in 2016 to 10% in 2021. Injuries in the construction sector comprised 42%-48% of all injuries, followed by the commerce sector. In 2021, the highest percentage of injuries involved service occupations (47.5%), followed by the engineering sector. Between 2016 and 2018, the most common injury cause was falls (28.5% in 2018), and from 2020 to 2021, exposure to inanimate mechanical forces caused the most injuries (46%).

Further, an estimated 395 million workers suffering from work-related injuries underscores a substantial global challenge. It stresses the imperative for enhanced safety standards and preventive measures across various industries. This statistic reflects a myriad of factors including inadequate safety practices, lack of employee training, and insufficient enforcement of regulations. Addressing these issues is crucial not only for the well-being of workers but also for economic sustainability, as work injuries carry significant financial implications due to medical costs, loss of productivity, and potential legal ramifications.

The construction sector's high incidence of injuries, ranging from 42%-48% of the total number of injuries, highlights the inherent risks associated with this industry. This sector is often characterized by physically demanding work, the operation of heavy machinery, and work at height, factors that can increase the likelihood of occupational hazards. The data reflect the crucial need for stringent safety regulations, comprehensive worker training, and adequate protective measures to mitigate these risks and protect the workforce. In Saudi Arabia, for example, the total of 28,227 work-related injuries reported in 2022 is indicative of significant occupational health challenges within the workforce. This figure demands a critical evaluation of workplace environments and the implementation of comprehensive safety protocols to address the high incidence of injuries. It also calls for increased vigilance and continuous improvement in both regulatory frameworks and industry practices to enhance worker safety and reduce these numbers in the future.

Past devices for addressing these problems include U.S. Pat. No. 420,179 to Yagn, which discloses a parallel passive exoskeleton comprising long leaf springs operating in parallel to the legs, and which was intended to augment the running abilities of the Russian Army. Additionally, the first active exoskeleton was disclosed by Prof. Vukobratovic in the *International Journal of Humanoid Robotics* 4.03 (2007). Initially, the focus was on making systems that could mimic walking. This work laid the foundation for today's advanced robots. Recently, there has been a renewed interest in such exoskeletons, especially for military use.

The prevalence of shoulder injuries due to work can vary based on the industry, job tasks, and other factors. Shoulder injuries are common in occupations that involve repetitive or strenuous activities, overhead work, heavy lifting, and awkward postures. Such injuries that can result from these activities include rotator cuff tears, shoulder impingement, and other musculoskeletal disorders. Various active arm orthoses have been under development for the rehabilitation of such issues as well as for advanced cases of dystrophy and similar diseases. Today's orthosis, or passive exoskeleton, versions are typically designed to boost the natural abilities of the human body, making people stronger and more capable.

A passive exoskeleton can prevent workplace injuries in several ways:
1) Load Redistribution: It redistributes the weight of loads, reducing strain on specific muscle groups.
2) Posture Support: It encourages proper posture, minimizing the risk of musculoskeletal disorders.
3) Movement Assistance: It assists with lifting and repetitive tasks, decreasing the chance of overexertion injuries.
4) Ergonomic Design: It is designed ergonomically to fit the user's body, preventing discomfort and potential injuries.

By supporting the body's natural movements and providing additional stability, a passive exoskeleton or orthosis can significantly reduce the incidence of work-related injuries. However, such exoskeletons can negatively affect the human body if various factors are ignored, such as low weight, weight distribution, and ratio between exoskeleton weight and wearer weight.

As noted previously, injuries in the construction sector have comprised about 45% of all noted work-related injuries. In view of such injuries, exoskeleton technology can increase productivity by up to 20%, reducing overall project timelines and costs. As such, exoskeletons are increasingly being used in the construction industry due to their potential to enhance worker safety, boost productivity, and create a more efficient work environment.

Some key attributes surrounding the use of exoskeletons in construction work include: 1). Strength Augmentation-Exoskeletons, sometimes referred to as exosuits, are wearable machines fitted with motorized joints that provide lift support, weight dispersion, posture correction, and other capabilities to minimize strain and injury; 2). Injury Prevention—By providing added support for a worker's back, legs, hands, or any area most affected by prolonged strain, exoskeletons can help reduce accumulated strain from prolonged, repetitive tasks throughout the workday; and 3). Increased Productivity-Exoskeletons can enhance a user's strength, making it easier to lift heavy objects and perform physically demanding tasks. This can lead to increased productivity and efficiency on the job site.

Currently, a variety of exoskeletons are available, each employing distinct mechanisms and materials. Key differentiators among these exoskeletons include their design, weight, and flexibility.

For example, the AGADEXO smart industrial exoskeleton is designed by the company Agade, a spin-off of Politecnico di Milano University. The Agadexo Shoulder exoskeleton combines passive elements with electric motors in a hybrid motion technology. This unique design allows the device to be lightweight, comfortable, and energy-efficient while dynamically adapting to the user's movements and payloads. It can generate up to 40 N/m and weighs only 4 Kg. but since it is an active exoskeleton, it needs a source of electricity.

Auxivo is a company that specializes in developing wearable exoskeletons, focusing on enhancing worker safety and well-being by offering innovative solutions to reduce physical workload and the risk of injury. Founded in 2019, the company emphasizes close cooperation with industry partners and continuous exchange with future users to ensure the development of practical and effective wearable exoskeletons. The Auxivo model can generate up to 13.2 N/m, weighs only 2.25 Kg and is passive so can be used without any power requirements.

Thus, a wearable ergonomic passive assistive device solving the aforementioned problems is desired.

SUMMARY

The present subject matter relates to a wearable ergonomic passive assistive device. In an embodiment, the device is an exoskeleton, which is a device used to enhance the capabilities of the human body. Such exoskeletons can be used for a variety of purposes, including but not limited to use in the medical sector to help patients in rehabilitation and use in the business sector to enhance performance and help reduce work injuries. The primary objective of the wearable ergonomic passive assistive device is to provide enhanced support and comfort for workers in the construction and manufacturing sectors, particularly during tasks that involve lifting or working overhead. This innovative device is designed to reduce physical strain, minimize fatigue, and lower the risk of injury by effectively distributing the load experienced by the user.

A first embodiment of the wearable ergonomic passive assistive device operates using a combination of springs and counterweights, which work in tandem to alleviate the pressure on the worker's muscles and joints, allowing them to perform overhead tasks with greater ease and less physical exertion. This mechanical assistance is crucial in environments where repetitive overhead movements are common and can lead to long-term musculoskeletal issues.

In an embodiment, the wearable ergonomic passive assistive device also includes the incorporation of an adjustable lock mechanism that allows users to customize the level of resistance of the spring based on the weight of the object they are handling. This mechanism works by pre-tensioning the springs to match the specific load being carried. For example, when handling a lighter object, such as a 2 kg item, the user can easily adjust the spring tension to suit the lower weight. Conversely, when the user is lifting a heavier load, such as a 5 kg item, the lock mechanism can be manually adjusted to increase the resistance of the springs, ensuring the device can effectively support the additional weight.

For this embodiment of the wearable ergonomic passive assistive device, having this adjustable system not only provides optimal support for a range of different weights but also offers increased flexibility and control for the user, thereby potentially enhancing both safety and efficiency during demanding tasks. By allowing for precise adjustment of the spring resistance, the present device ensures that workers are able to perform their jobs with reduced physical strain, ultimately improving productivity and reducing the likelihood of injury in the workplace.

These and other features of the present subject matter will become readily apparent upon further review of the following specification.

BRIEF DESCRIPTION OF DRAWINGS

FIG. 3 is a diagram of the wearable ergonomic passive assistive device including key points of articulation.

FIG. 4 is a view of the wearable ergonomic passive assistive device show the attached arm pads to the distal end of lever arms of the wearable passive assistive device.

Similar reference characters denote corresponding features consistently throughout the attached drawings.

DETAILED DESCRIPTION

Figure 2:
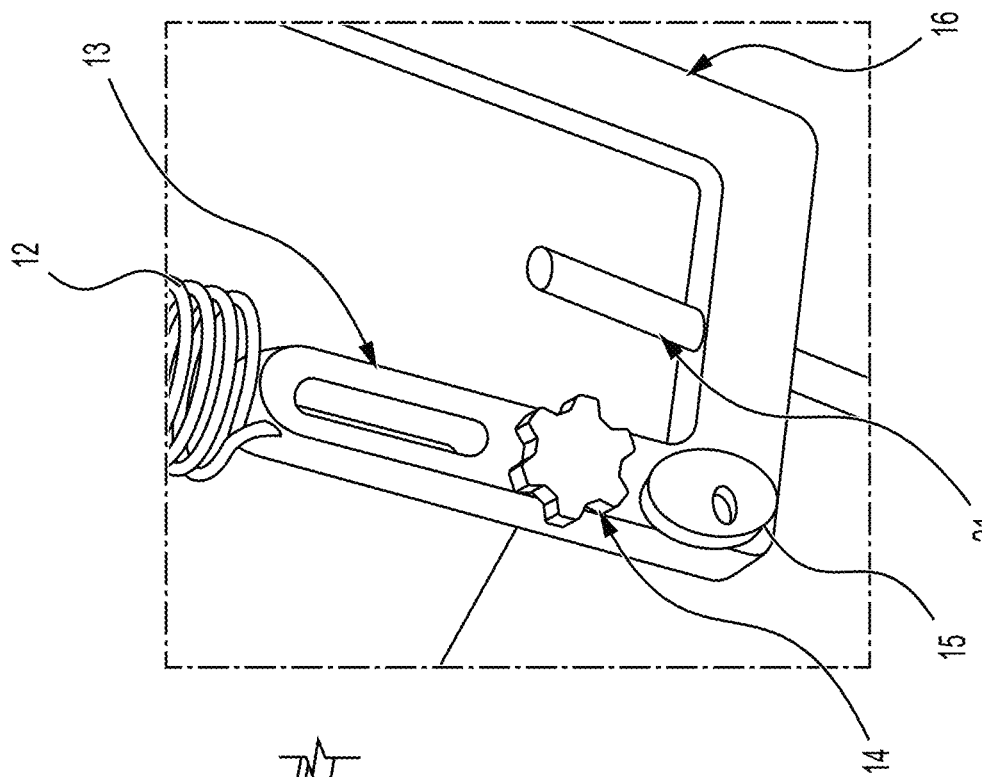
FIG. 2 is an enlarged view of the inset of the locking mechanism of the wearable ergonomic passive assistive device of FIG. 1.

Throughout the application, where products are described as having, including, or comprising specific components, or where processes or methods are described as having, including, or comprising specific process or method steps, it is contemplated that products of the present teachings can also consist essentially of, or consist of, the recited components, and that the processes or methods of the present teachings can also consist essentially of, or consist of, the recited process or method steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a product or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, length ranges or width ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

An embodiment of the wearable ergonomic passive assistive device is shown in FIGS. 1-5 and comprises a generally L shaped brace for each arm of the person wearing the wearable ergonomic passive assistive device. FIGS. 3-4 show two such L shaped braces seated (18) upon a respective right and a left side of a wearable vest (40) were each L shaped brace includes a L shaped post support (16), a lever arm consisting of a distal portion (11) and a generally right triangular shaped joint portion (10), a pair of lower connectors (13), an upper connector (17), a lock mechanism (15), a ratchet (14), a spring (19) for the right side L-shaped brace, and a spring (12) for the left side L shaped brace of the wearable ergonomic passive assistive device. In an embodiment, the post support (16) will spin about the y-axis allowing the arms to rotate both left and right for comfortable movement and will make the lever arm (10, 11) rotate about the x-axis allowing the arms to move up and down.

FIG. 4 also shows substantially cylindrical arm pads (41) with straps (42) which would secure the pads to the respective forearms of the user when the wearable ergonomic passive assistive device is worn. FIG. 2 also shows that the base of the post support (16) has a hole through which a mounting rod (21) is inserted such that the L shaped brace is attached to the seat in the vest of the wearable ergonomic passive assistive device. The arm pads will support and hold the arms so they can be raised.

Figure 1:
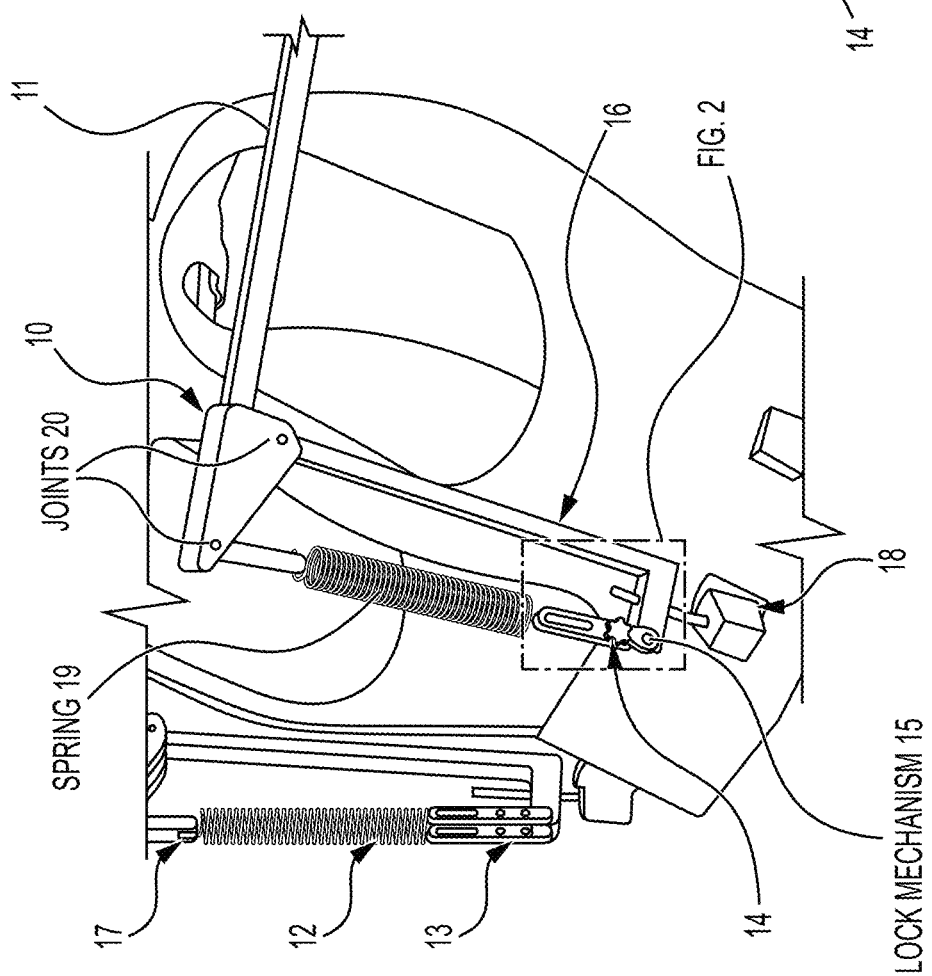
FIG. 1 is a diagram of the wearable ergonomic passive assistive device.
Figure 5:
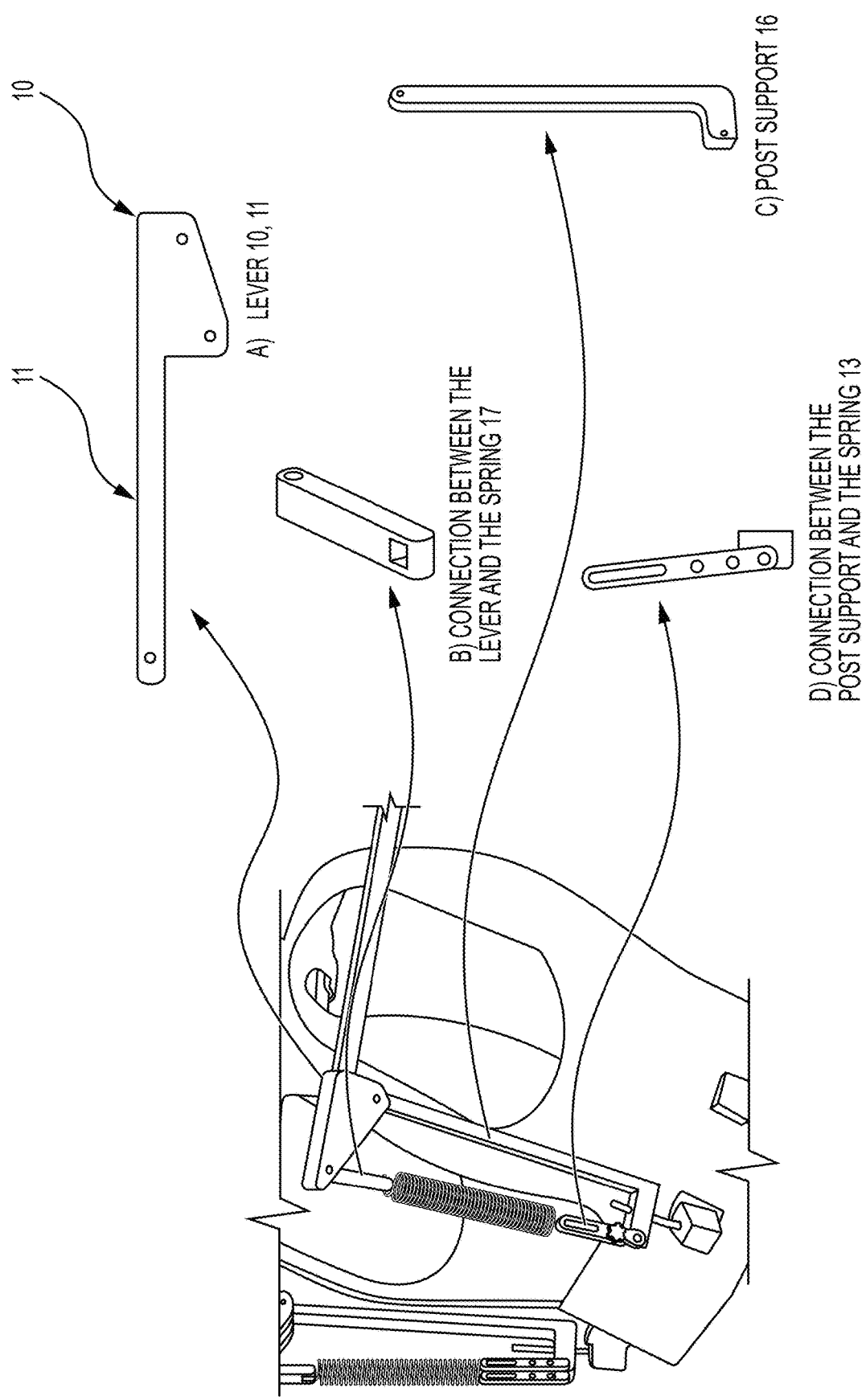
FIG. 5 is a diagram of the wearable ergonomic passive assistive device and its constituent elements.

As shown in FIGS. 1 and 3, the first embodiment has the joint portion (10) of the lever arm connected to a top of portion of post support (16) and a top portion of upper connector (17). The bottom portion of the upper connector (17) has a cubic aperture as shown in FIG. 5 (shown in the B notation) is used to retain one end of the spring (19) for, e.g., the right-hand side L shaped brace. Both springs (12) and (19) are extension springs and store energy and exert a pulling force between the upper connector (17) and the pair of lower connectors (13) in each L shaped brace of the wearable ergonomic passive assistive device. In an embodiment, the extension springs (12, 19) use round wire to create a close-wound design with an initial tension. Any other material suitable for creating springs having similar properties are further contemplated as within the scope of the present subject matter. When the upper connector (17) and the pair of lower connectors (13) separate, the extension springs (12, 19) will try to bring them together again. Hooks and loops of the extension springs store and absorb energy. Through such hooks or loops, the extension springs (12, 19) provide respective return forces to the upper connector (17) and the pair of lower connectors (13) in each L shaped brace of the wearable ergonomic passive assistive device. The tightly wound extension springs (12, 19) typically sit in the no-load position. More stress in the end hooks, as opposed to the spring body, can limit the performance of the extension springs.

As shown in FIGS. 1 and 2, the wearable ergonomic passive assistive device can also include the incorporation of an adjustable lock mechanism that allows users to customize the level of resistance of the extension springs (12, 19) based on the weight of the object they are handling. This mechanism works by pre-tensioning the springs to match the specific load being carried using the rotatable rachet (14). For example, when handling a lighter object, such as a 2 kg item, the user can easily adjust the spring tension to suit the lower weight by turning the ratchet (14) to an appropriate setting and then using the lock mechanism (15) to secure the ratchet in place. Conversely, when the user is lifting a heavier load, such as a 5 kg item, the ratchet (14) and the lock mechanism (15) can be manually adjusted to increase the resistance of the springs, ensuring the device can effectively support the additional weight. Additionally, with a separate L shaped brace on each side of the vest, the left L shaped brace of the wearable ergonomic passive assistive device can be configured to meet a different load requirement than the right L shaped brace of the wearable ergonomic passive assistive device. In the above example, the left side L shaped brace can be configured to handle the lighter 2 kg object while the right side L shaped brace can be configured to handle the 5 kg object due to the use of separate extension springs (12, 19) in the wearable ergonomic passive assistive device.

FIG. 5 shows that each lower connector (13) has three circular holes, an uppermost hole, a middle hole, and a lowest in the bottom half of each connector (13). When configuring the L-shaped brace for a lighter 2 kg object weight, the ratchet (14) is inserted into the middle hole and the locking mechanism (15) is secured to the lowest circular hole and connected to a horizontal segment of the post support (16). When configuring the L-shaped brace for a heavier 5 kg object weight, the ratchet (14) is inserted into the uppermost hole and the locking mechanism (15) is secured to the middle circular hole and connected to a horizontal segment of the post support (16). In both configurations, the bottom hook of each extension spring (12, 19) is connected to the slot like opening at the top half of each connector (13).

Figure 10:
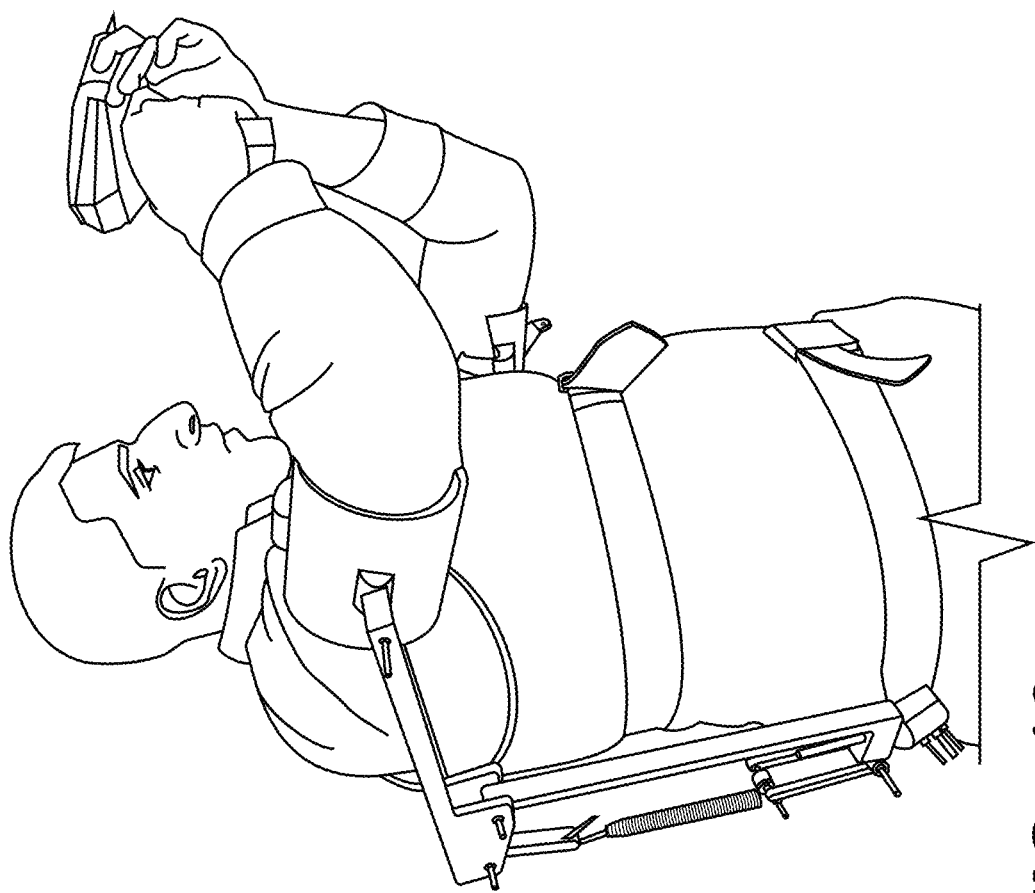
FIG. 10 is a view of the wearable ergonomic passive assistive device when worn with a vest.
Figure 9:
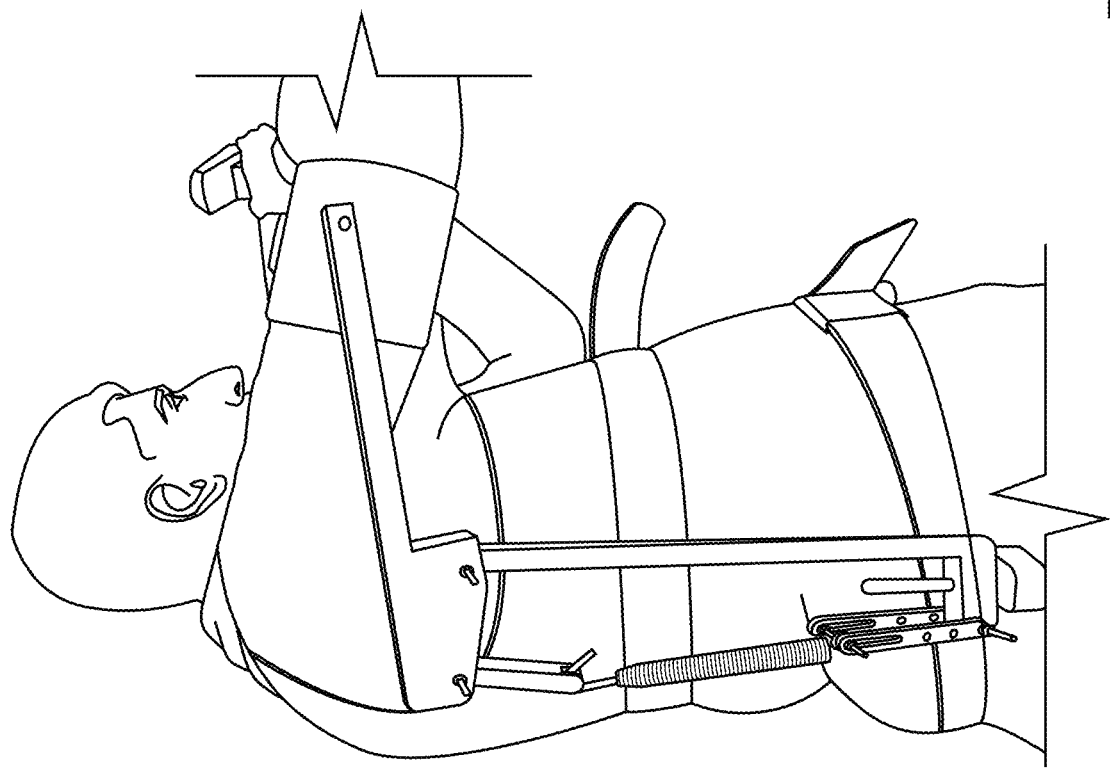
FIG. 9 is a side view of the wearable ergonomic passive assistive device when worn with a vest.

As shown in FIGS. 4, 9, and 10, when in use, the vest is worn by the worker such that arm pads (41) attach in snug fashion to the upper arms of the worker and are secured in place by the straps which are pulled tightly to secure the arm pads in place. The vest (40) is secured to the worker by two belts, one at the waist, and one at the diaphragm level of the worker.

Figure 6:
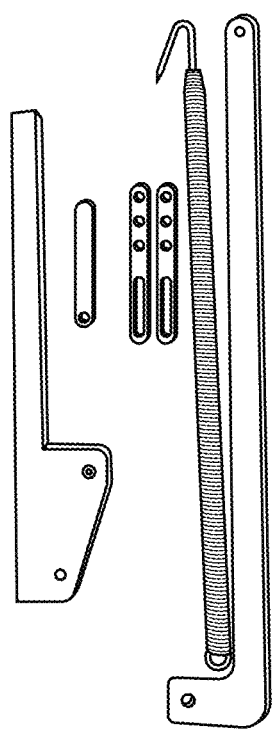
FIG. 6 is a diagram of the set of disassembled constituent elements of the wearable ergonomic passive assistive device.
Figure 7:
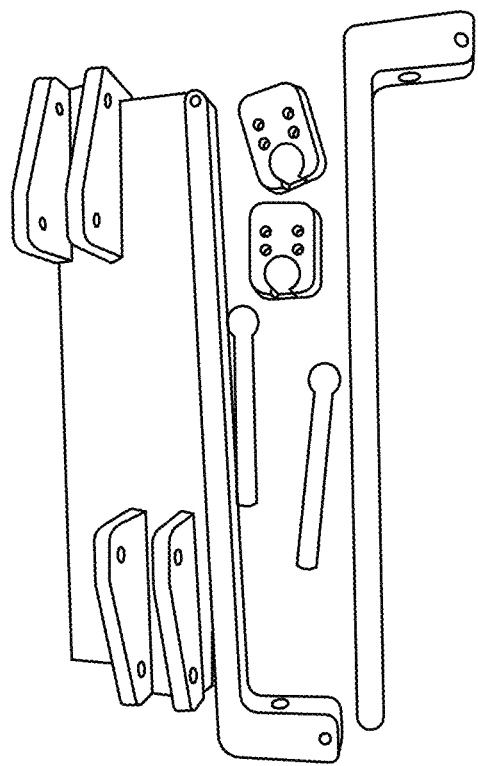
FIG. 7 is a diagram of the assembled constituent elements of the wearable ergonomic passive assistive device of FIG. 6 without the extension spring.

FIGS. 6-7 show an embodiment of the wearable ergonomic passive assistive device where the constituent components of the wearable ergonomic passive assistive device are made of iron, aluminum, or some other suitable, machinable metal for a more durable version of the wearable ergonomic passive assistive device. FIG. 6 shows the wearable ergonomic passive assistive device when disassembled such that it can be easily carried to various job sites, assembled on site, used and then disassembled again for use when needed again. FIG. 7 shows the wearable ergonomic passive assistive device of FIG. 6 assembled but without the installation of the extension springs (12, 19).

Figure 8:
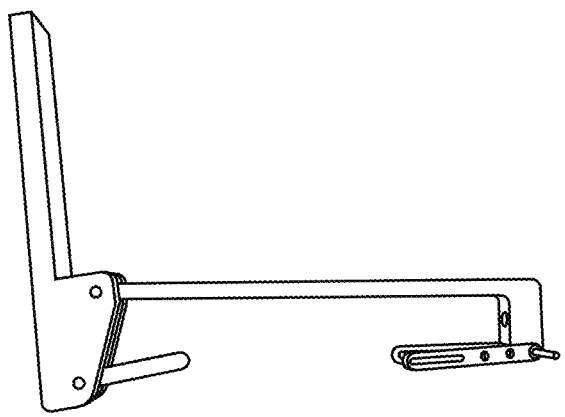
FIG. 8 is diagram of the set of disassembled constituent elements of the wearable ergonomic passive assistive device produced using 3-D printing techniques.

FIG. 8 shows an embodiment of the wearable ergonomic passive assistive device made through 3-D printing techniques for an embodiment of the wearable ergonomic passive assistive device that weighs less and therefore is less burdensome on the worker wearing the vest. It is also shown as disassembled and would be used in the same a manner as discussed above concerning the metal based wearable ergonomic passive assistive device of FIGS. 6-7.

It is to be understood that the wearable ergonomic passive assistive device is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A wearable ergonomic passive assistive device, comprising:
    a vest configured to be worn on a torso of a user; and
    at least one L shaped brace configured to secure an arm of the user of the wearable ergonomic passive assistive device, the at least one L shaped brace further comprising:
        a lever arm including a distal portion and a joint portion;
        a post support having an upper portion and a lower portion, said upper portion of said post support being connected to said joint portion of said lever arm;
        an upper connector having an upper portion and a lower portion, said upper portion of said upper connector being connected to said joint portion of said lever arm, said lower portion of said upper connector having an opening;
        at least one lower connector having an upper portion and a lower portion, said upper portion of said at least one lower connector having an opening, said lower portion of said at least one lower connector having a plurality of circular holes;
        a spring connected to said lower portion of said upper connector at a cubic opening and said spring connected to said upper portion of said lower connector at a slot opening;
        a locking mechanism connected to the lower portion of the at least one lower connector, said locking mechanism being connected to at least one of said plurality of circular holes;
        a ratchet connected to the lower portion of the at least one lower connector, said ratchet being connected to at least another one of said plurality of circular holes;
        a seat for providing the L-shaped brace an attachment point to the vest;
        a mounting rod for providing support to the L-shaped brace; and
        an arm pad,
        wherein said locking mechanism engages said ratchet to secure said ratchet in place.

2. The wearable ergonomic passive assistive device as recited in claim 1, wherein the at least one L shaped brace configured to secure an arm of the user of the wearable ergonomic passive assistive device comprises a left L shaped arm brace configured to secure a left arm of the user and a right L shaped arm brace configured to secure a right arm of the user.

3. The wearable ergonomic passive assistive device as recited in claim 1, wherein the spring is an extension spring.

4. The wearable ergonomic passive assistive device as recited in claim 1, wherein the arm pad has a strap configured to secure the arm pad to the arm of the user.

5. The wearable ergonomic passive assistive device as recited in claim 1, wherein the post support has a hole in the lower portion of the L shaped brace for receiving the mounting rod for securing the L shaped brace to the vest at the seat.

6. The wearable ergonomic passive assistive device as recited in claim 1, wherein the at least one lower connector comprises a first lower connector and a second lower connector.

7. The wearable ergonomic passive assistive device as recited in claim 1, wherein the locking mechanism and the ratchet can be adjusted to increase a resistance of the spring and thereby provide additional support for an object's weight that the user is carrying.

8. The wearable ergonomic passive assistive device as recited in claim 1, wherein the arm pad is mounted on the distal portion of the lever arm.

9. The wearable ergonomic passive assistive device as recited in claim 1, further comprising: an upper connector having an upper portion and a lower portion, said upper portion of said upper connector being connected to said joint portion of said lever arm, said lower portion of said upper connector having a cubic opening.

10. The wearable ergonomic passive assistive device as recited in claim 1, further comprising: at least one lower connector having an upper portion and a lower portion, said upper portion of said at least one lower connector having an opening, said lower portion of said at least one lower connector having a plurality of three circular holes.

11. The wearable ergonomic passive assistive device as recited in claim 1, further comprising: at least one lower connector having an upper portion and a lower portion, said upper portion of said at least one lower connector having a slot opening, said lower portion of said at least one lower connector having a plurality of circular holes.

* * * * *